United States Patent
Fried et al.

(10) Patent No.: US 9,262,324 B2
(45) Date of Patent: Feb. 16, 2016

(54) EFFICIENT DISTRIBUTED CACHE CONSISTENCY

(71) Applicant: International Business Machines Corporation, Armonk, NY (US)

(72) Inventors: Eric P. Fried, Austin, TX (US); Lance W. Russell, Rosanky, TX (US)

(73) Assignee: International Business Machines Corporation, Armonk, NY (US)

( * ) Notice: Subject to any disclaimer, the term of this patent is extended or adjusted under 35 U.S.C. 154(b) by 41 days.

(21) Appl. No.: 14/302,981

(22) Filed: Jun. 12, 2014

(65) Prior Publication Data

US 2015/0169497 A1 Jun. 18, 2015

Related U.S. Application Data

(63) Continuation of application No. 14/104,008, filed on Dec. 12, 2013.

(51) Int. Cl.
*G06F 12/12* (2006.01)
*G06F 12/08* (2006.01)
*G06F 15/173* (2006.01)

(52) U.S. Cl.
CPC .......... *G06F 12/0822* (2013.01); *G06F 12/084* (2013.01); *G06F 12/0831* (2013.01); *G06F 15/17331* (2013.01); *G06F 2212/154* (2013.01); *G06F 2212/60* (2013.01)

(58) Field of Classification Search
CPC ............ G06F 12/0822; G06F 12/0831; G06F 15/17331
USPC .......................................................... 711/141
See application file for complete search history.

(56) References Cited

U.S. PATENT DOCUMENTS

| 5,490,270 | A | 2/1996 | Devarakonda et al. |
| 5,553,239 | A | 9/1996 | Heath et al. |
| 5,612,865 | A | 3/1997 | Dasgupta |

(Continued)

FOREIGN PATENT DOCUMENTS

| EP | 1094651 A1 | 4/2001 |
| EP | 1197862 A1 | 4/2002 |

OTHER PUBLICATIONS

U.S. Appl. No. 12/957,853, printed Jun. 11, 2014, 3 pages.

(Continued)

*Primary Examiner* — Jae Yu
(74) *Attorney, Agent, or Firm* — Stephen J. Walder, Jr.; Thomas E. Tyson

(57) ABSTRACT

Mechanisms are provided for performing a write operation on a shared resource in a cluster of data processing systems. The mechanisms determine whether a locally cached copy of the shared resource is present in a local cache memory. The mechanisms, in response to a determination that a locally cached copy is present, determine whether the locally cached copy is a latest version of the shared resource. The mechanisms, in response to determining that that locally cached copy is a latest version: perform the write operation on the locally cached copy to generate an updated locally cached copy, and transmit a cluster event notification to other data processing systems of the cluster indicating the shared resource was written to and which data processing system performed the write operation. The cluster event notification is logged in at least one change log data structure associated with the other data processing systems.

10 Claims, 6 Drawing Sheets

(56) References Cited

U.S. PATENT DOCUMENTS

| | | | |
|---|---|---|---|
| 5,666,486 | A | 9/1997 | Alfieri et al. |
| 5,870,759 | A | 2/1999 | Bauer et al. |
| 5,870,765 | A | 2/1999 | Bauer et al. |
| 5,881,316 | A | 3/1999 | Chaney et al. |
| 5,884,325 | A | 3/1999 | Bauer et al. |
| 5,898,836 | A | 4/1999 | Freivald et al. |
| 6,014,669 | A | 1/2000 | Slaughter et al. |
| 6,038,625 | A | 3/2000 | Ogino et al. |
| 6,047,332 | A | 4/2000 | Viswanathan et al. |
| 6,108,699 | A | 8/2000 | Moiin |
| 6,119,131 | A | 9/2000 | Cabrera et al. |
| 6,163,806 | A | 12/2000 | Viswanathan et al. |
| 6,219,818 | B1 | 4/2001 | Freivald et al. |
| 6,247,149 | B1 | 6/2001 | Falls et al. |
| 6,256,740 | B1 | 7/2001 | Muller et al. |
| 6,269,374 | B1 | 7/2001 | Chen et al. |
| 6,353,898 | B1 | 3/2002 | Wipfel et al. |
| 6,453,426 | B1 | 9/2002 | Gamache et al. |
| 6,460,133 | B1 | 10/2002 | Nunez et al. |
| 6,467,050 | B1 | 10/2002 | Keung |
| 6,662,219 | B1 | 12/2003 | Nishanov et al. |
| 6,694,459 | B1 | 2/2004 | Nyman |
| 6,748,429 | B1 | 6/2004 | Talluri et al. |
| 7,010,617 | B2 | 3/2006 | Kampe et al. |
| 7,076,597 | B2 | 7/2006 | Webb, Jr. et al. |
| 7,103,616 | B1 | 9/2006 | Harmer et al. |
| 7,107,267 | B2 | 9/2006 | Taylor |
| 7,171,476 | B2 | 1/2007 | Maeda et al. |
| 7,200,626 | B1 | 4/2007 | Hoang et al. |
| 7,269,706 | B2 | 9/2007 | Agarwal et al. |
| 7,289,998 | B2 | 10/2007 | Kalos |
| 7,334,089 | B2 | 2/2008 | Glasco |
| 7,401,093 | B1 | 7/2008 | Hamilton et al. |
| 7,441,159 | B2 | 10/2008 | Meng et al. |
| 7,593,968 | B2 | 9/2009 | Beck |
| 7,617,257 | B2 | 11/2009 | Sathyanarayan et al. |
| 7,617,289 | B2 | 11/2009 | Srinivasan et al. |
| 8,095,753 | B1 | 1/2012 | Pandey et al. |
| 8,176,014 | B2 | 5/2012 | Jacobs et al. |
| 8,705,504 | B2 * | 4/2014 | Moon ............... H04L 67/2842 370/331 |
| 2002/0002582 | A1 | 1/2002 | Ewing et al. |
| 2002/0042693 | A1 | 4/2002 | Kampe et al. |
| 2002/0059465 | A1 | 5/2002 | Kim |
| 2002/0087801 | A1 * | 7/2002 | Bogin ............... G06F 12/0862 711/137 |
| 2002/0198883 | A1 * | 12/2002 | Nishizawa ........ G06F 17/30902 |
| 2003/0145210 | A1 | 7/2003 | Taylor |
| 2004/0078455 | A1 | 4/2004 | Eide et al. |
| 2004/0088294 | A1 | 5/2004 | Lerhaupt |
| 2004/0199486 | A1 | 10/2004 | Gopinath et al. |
| 2005/0015471 | A1 | 1/2005 | Zhang et al. |
| 2005/0171927 | A1 | 8/2005 | Chan et al. |
| 2006/0100981 | A1 | 5/2006 | Jones et al. |
| 2006/0167921 | A1 | 7/2006 | Grebus et al. |
| 2006/0173932 | A1 | 8/2006 | Cortright et al. |
| 2007/0168793 | A1 | 7/2007 | Seo |
| 2007/0276833 | A1 | 11/2007 | Sen et al. |
| 2008/0052455 | A1 | 2/2008 | Ahmadian et al. |
| 2009/0172195 | A1 | 7/2009 | Risbud |
| 2010/0154054 | A1 | 6/2010 | Beck |
| 2012/0143829 | A1 | 6/2012 | Fontenot et al. |
| 2012/0143836 | A1 | 6/2012 | Fried et al. |
| 2012/0143887 | A1 | 6/2012 | Fontenot et al. |
| 2012/0143892 | A1 | 6/2012 | Fried et al. |
| 2012/0209821 | A1 | 8/2012 | Fried et al. |

OTHER PUBLICATIONS

U.S. Appl. No. 12/957,894, Jun. 11, 2014, 3 pages.
U.S. Appl. No. 12/957,937, Jun. 11, 2014, 3 pages.
U.S. Appl. No. 12/957,980, Jun. 11, 2014, 3 pages.
U.S. Appl. No. 13/456,388, Jun. 11, 2014, 2 pages.
U.S. Appl. No. 14/104,008, Jun. 11, 2014, 1 page.
"International Business Machines Corporation", International Application No. PCT/EP2011/071309; International Search Report and Written Opinion dated Mar. 14, 2012, 13 pages.
"International Business Machines Corporation", International Application No. PCT/EP2011/071367; International Search Report and Written Opinion dated May 15, 2012, 11 pages.
Ghemawat, Sanjay et al., "The Googie File System", SOSP '03, Oct. 19-22, 2003, ACM 2003, Bolton Landing, NY, 15 pages.
Gordon, Susan, "Database Integrity; Security, Reliability, and Performance Considerations", Indiana University South Bend, South Bend, IN, pp. 1-12.
Herminghaus, et al., "Storage Management in Data Centers, Chap. 11.3, Disk Outage in Detail", http://books.google.com, 1 page.
Kronenberg, et al., "VAXclusters: A Closely-Coupled Distributed System", ACM Transactions on Computer Systems, vol. 4, No. 2, May 1986, Dept. of Computer Science, University of Washington, Seattle, WA, 1986, ACM 0734-0261; pp. 130- 146.
Murat, "Metadata: The Role of Distributed State", muratbuffalo.blogspot.com/2010/11/role-of-distributed-state.html, Wednesday, Nov. 3, 2010, 3 pages.
Nelson, Michael N. et al., "Caching in the Sprite Network File System", Computer Science Division, Department of Electrical Engineering and Computer Science, University of California, Berkeley, CA, Accessed from the Internet Sep. 6, 2013, 35 pages.
Nick, J.M. et al., "S/390 cluster technology: Parallel Sysplex", http://researchweb.watson.ibm.com/journals/sj/362/nick.pdf, 33 pages.
Singh, Kamal, "CS Article", Nov. 16, 2005; http://www/cs.sjsu.edu/faculty/stamp/CS249/projects/Chapter14.pdf; 54 pages.
Vogels, Werner et al., "The Design and Architecture of the Microsoft Cluster Service", Published in the Proceedings of FTCS '98, Jun. 23-25, 1998, Munich, Germany; IEEE; 11 pages.

* cited by examiner

EFFICIENT DISTRIBUTED CACHE CONSISTENCY

This application is a continuation of application Ser. No. 14/104,008, filed Dec. 12, 2013, status pending.

BACKGROUND

The present application relates generally to an improved data processing apparatus and method and more specifically to mechanisms for providing efficient distributed cache consistency.

A cluster system, also referred to as a cluster multiprocessor system (CMP) or simply as a "cluster," is a set of networked data processing systems (or "nodes") with hardware and software shared among those data processing systems, typically (but not necessarily) configured to provide highly available and highly scalable application services. Cluster systems are frequently implemented to achieve high availability as an alternative to fault tolerance for mission-critical applications such as data centers, aircraft control, and the like. Fault tolerant data processing systems rely on specialized hardware to detect hardware faults and to switch to a redundant hardware component, regardless of whether the component is a processor, memory board, hard disk drive, adapter, power supply, etc. While providing seamless cutover and uninterrupted performance, fault tolerant systems are expensive due to the requirement of redundant hardware, and fail to address software errors, a more common source of data processing system failure.

High availability can be achieved in a cluster implemented with standard hardware through the use of software that permits resources to be shared system wide. When a node, component, or application fails, the software quickly establishes an alternative path to the desired resource. The brief interruption required to reestablish availability of the desired resource is acceptable in many situations. The hardware costs are significantly less than fault tolerant systems, and backup facilities may be utilized during normal operation.

The nodes of a cluster share resources of the cluster, including files, data structures, storage devices, and the like. As such, the various nodes of a cluster may each attempt to read and write data from/to these shared resources. Hence, mechanisms for controlling the reads and writes so as to ensure the veracity of the shared resources are usually implemented.

SUMMARY

In one illustrative embodiment, a method, in a data processing system comprising a processor and a memory, for performing a write operation on a shared resource in a cluster of data processing systems is provided. The method comprises determining, by the data processing system, whether a locally cached copy of the shared resource is present in a local cache memory of the data processing system. The method further comprises, in response to a determination that a locally cached copy of the shared resource is present in the local cache memory, determining whether the locally cached copy of the shared resource is a latest version of the shared resource. In addition, the method comprises, in response to determining that that locally cached copy of the shared resource is a latest version of the shared resource: performing the write operation on the locally cached copy of the shared resource to generate an updated locally cached copy of the shared resource; and transmitting a cluster event notification to other data processing systems of the cluster indicating the shared resource was written to and identifying which data processing system in the cluster performed the write operation. The cluster event notification is logged in at least one change log data structure associated with the other data processing systems.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

Figure 1:
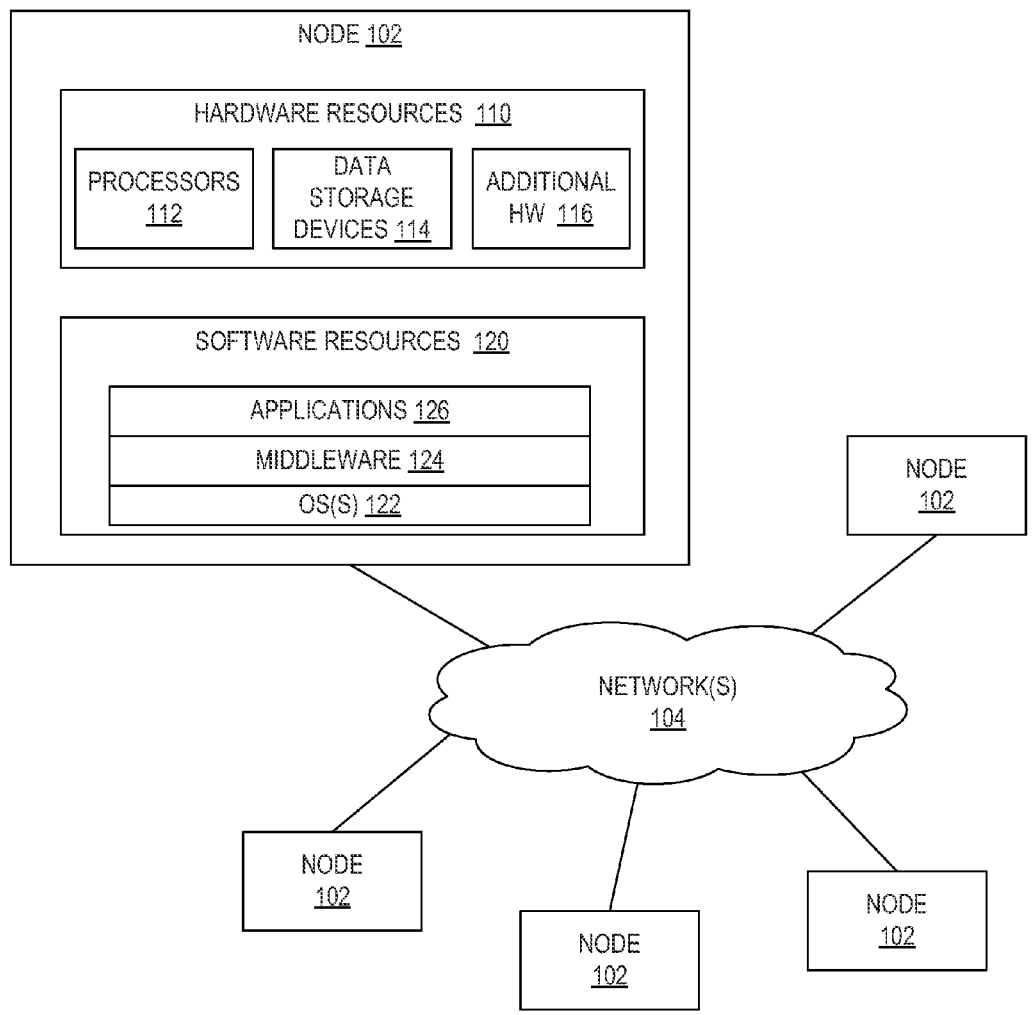
FIG. 1 is a high level block diagram of an exemplary data processing environment that may be configured as a cluster system in accordance with one embodiment.

The illustrative embodiments provide mechanisms for providing efficient distributed cache consistency. In particular, the mechanisms of the illustrative embodiments address cache consistency when writes to shared resources are cached at local caches of nodes in a group of nodes, such as a cluster. Because many shared resource based systems, such as clustered computing systems, allow the individual computing devices, processors, or the like (i.e. nodes) to cache their writes to the shared resource in a local cache before flushing these writes to the centralized shared resource as part of a synchronization operation, reads to the same shared resource may become stale, i.e. may be directed to an out-of-date version of the shared resource. For example, a first node A may perform multiple writes to a shared resource R of a cluster and cache those writes in a local cache associated with node A. Meanwhile, node B may wish to read the shared resource R prior to the writes to the shared resource R being committed at the centralized copy of the shared resource R, i.e. prior to the synchronization operation performed between the cache of writes at node A and the centralized shared resource R. As a result, the nodes of the cluster may have an inconsistent view of the shared resource R.

The illustrative embodiments provide mechanisms for ensuring consistency in such a distributed cache architecture. Moreover, the illustrative embodiments provide efficient mechanisms for ensuring such consistency by providing notification mechanisms that utilize small size event notifications that are communicated between the nodes of a cluster when any one node obtains a cluster-wide lock on a shared resource and performs a write to the shared resource. The small size event notification that is transmitted by the node obtaining the lock and performing the write operation comprises a small, fixed size payload that specifies the identity of the changed resource, the identity of the node performing the change, and a staleness indicator, e.g., a timestamp, version number, or the like. The event notification is transmitted by a source node to each of the other nodes in the cluster, or to a centralized cluster control node.

The event notification is stored in a change log that is used to identify which resources are being accessed by nodes in the cluster and which nodes are accessing the resources. There may be a single change log stored in a centralized location that maintains the event notifications from the various nodes of the cluster for all of the shared resources, or there may be separate change log data structures maintained in each of the nodes. Moreover, there may be multiple change log data structures maintained in each of the nodes or in the centralized location, such as one for each user, one for each directory, one for each shared resource, or the like.

The event notifications are sent by the node in response to each write operation performed by the node to the shared resource, where the write operations are performed locally on a local cached copy of the shared resource. Thus, multiple entries may be stored in the change log data structure(s) for a series of write operations performed on the shared resource. The staleness indicator in the event notification entries in the change log data structures indicates the most recent event notification entry. The event notification entries further specify which node is responsible for the latest write to the shared resource identified in the event notification entry.

When a node attempts to open a path to a shared resource, such as via a file open process for example, either for a read or a write operation, the node first attempts to obtain a cluster-wide lock on the shared resource. If another node currently has a cluster-wide lock on the shared resource, then the present node cannot obtain the lock and will simply spin on the lock waiting for the lock to be released. Assuming that the cluster-wide lock is available and is not held by another node, the present node then checks the centralized change log data structure(s) or its own local change log data structure(s), depending on the particular embodiment, and searches the change log data structure for an entry having a shared resource identifier matching the shared resource identifier of the shared resource that the node is attempting to access by opening the path. If the shared resource identifier is not present in the change log data structure, or an entry is posted to the change log data structure indicating that the previous change log data structures should be ignored due to a synchronization of the cached writes to the shared resource, then the node may obtain the cluster-wide lock on the shared resource, obtain and store a cached copy of the shared resource from its source location, and perform its read/write operations to its local cached copy of the shared resource.

If the shared resource identifier is present in the change log data structure, various operations may be performed to facilitate the node's access to the shared resource, while maintaining consistency of the shared resource state in the distributed cache environment. The node identified in the most recent matching entry of the change log data structure is identified as the node that last accessed the shared resource, and which therefore has the latest version in its local cache. In a first embodiment, the node wishing to access the shared resource sends a control message instructing the node possessing the latest copy of the shared resource to perform a synchronization operation, i.e. forcing the synchronization operation. Such a synchronization operation may comprise performing an unmount operation, for example, forcing a flush of the node's local cache such that the cached writes are committed to the shared resource, or the like. In another illustrative embodiment, the access operations that the node wishes to perform on the shared resource may be remotely performed by the node possessing the latest version of the shared resource. That is, the I/O access requests may be sent to the node possessing the latest version of the shared resource and that node may act as a surrogate and perform the operations on its own local cached copy of the shared resource. This may be accomplished by connecting the calling request to a socket where the other side of the socket patches the connection and mimics the original call.

At any time, the node possessing the latest version of the shared resource may flush its cache to the central location of the shared resource. In flushing the cache, the local cached copy of the shared resource copies over, or otherwise replaces, the now out-of-date centralized shared resource.

The illustrative embodiments have significant advantages over existing art in the area of refreshing distributed caches. Current solutions either time-out stale entries (e.g., local copies of the resource) in the local caches or continuously poll for changes to shared resource attributes. With the timing out of stale entries, after a certain predetermined amount of time, the cache entry is automatically declared stale and discarded. As a result, the next access must retrieve a fresh copy of the resource from the source. This mechanism by itself does not guarantee that a node will always operate on a current copy of the resource. Furthermore, this solution may generate extraneous network traffic as it will blindly re-retrieve the resource when the cache entry expires, whether the resource has been changed or not.

With regard to the polling solution, a query is sent to the source of the resource at regular intervals, e.g., once a second, once a minute, etc. depending on the implementation, asking whether the resource has been updated. This query can take many forms including comparing the current resource state to a last known modification date, comparing to a last known checksum, or the like. If the query determines the resource has been modified, the node will retrieve a fresh copy of the resource for its cache. This is a better solution than the time-out solution because only resources that have been modified are re-retrieved. However, there is a drawback in that a resource is always being re-retrieved if it is modified, whether the resource is going to be used or not. This solution also leaves a window between pollings where the resource can still become stale and thus, consistency is not guaranteed with this solution.

The illustrative embodiments eliminate the need to check whether a resource has been updated or not because the nodes of the cluster have already been notified (or not) that the resource has changed and thus, there is no need to send a potentially slow and costly query to the source, e.g., central repository. Moreover, the illustrative embodiments eliminate the need to perform polling. That is, with the illustrative embodiments, if a node wishes to maintain 100% consistency at the cost of potentially unnecessary network traffic, i.e. always copying the latest version even if the resource is not going to be used, the node can respond to cluster event notifications by immediately refreshing the node's local cache. This eliminates the probability that the local copies of the resources in the local cache are stale at any given time. This is in contrast to current polling solutions where the probability of a stale cache entry is proportional to the poll interval.

With the mechanisms of the illustrative embodiments, when a cluster event notification is received by the other nodes, or in the centralized cluster control device, the other nodes are informed that the entry, i.e. each node's locally cached copy of the resource, is stale. If a node does not have a locally cached copy of the resource, i.e. an entry in the local cache for the resource, then this event notification may be ignored by that node. Thus, no polling is necessary to identify that the shared resource has been modified. Moreover, the particular shared resource that is stale is known from the information communicated in the event notifications and thus, no searching through entire directories and their attributes for shared resources that have changed is necessary. Moreover, the mechanisms of the illustrative embodiments may be implemented independent of a cluster file system.

Furthermore, event notifications are transmitted very quickly to the other nodes, or the centralized cluster control device and thus, the life of a stale entry is short. That is, if a node is to keep its cached copy of resources consistent all of the time, the node can refresh immediately upon receiving the event notification. However, this is not a requirement of the illustrative embodiments. In fact, a node may disregard notifications until such a time as it needs to reuse the resource. Thus, in a case where notifications are disregarded until such a time that the resource is to be reused, the life of a stale entry may be indefinitely long.

To further illustrate the difference between polling solutions and the mechanisms of the illustrative embodiments, it should be kept in mind that polling solutions are blind and merely occur on a regular interval. The queries represent network traffic which can be seen as "wasted" traffic any time a query indicates the resource has not been updated since the last polling occurred. In contrast, the mechanisms of the illustrative embodiments send a very small event notification only when a resource has been updated and this event notification informs all of the nodes that their local copies of the resource are stale.

In addition with polling solutions, the window where a resource is potentially stale is effectively the entire poll interval. However, with the mechanisms of the illustrative embodiments, depending on the particular implementation by which the local cache is refreshed, the window is either the lifecycle of a single lock instance, i.e. a very small window, or however long it takes another node to make a second modification while the first event notification is being processed. This is the smallest potential staleness window that is mathematically able to be achieved.

Moreover, polling solutions always require an application (or the user) to make a tradeoff between having shorter polling intervals, in order to decrease the potential staleness window, and having increased network noise by requiring polling to be done more often with potentially higher instances of "wasted" network traffic, or lower network noise but longer polling intervals. The mechanisms of the illustrative embodiments eliminate this tradeoff issue since there is no polling done and small event notifications are sent only when necessary, i.e. when a resource is actually modified.

The above aspects and advantages of the illustrative embodiments of the present invention will be described in greater detail hereafter with reference to the accompanying figures. It should be appreciated that the figures are only intended to be illustrative of exemplary embodiments of the present invention. The present invention may encompass aspects, embodiments, and modifications to the depicted exemplary embodiments not explicitly shown in the figures but would be readily apparent to those of ordinary skill in the art in view of the present description of the illustrative embodiments.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in any one or more computer readable medium(s) having computer usable program code embodied thereon.

Any combination of one or more computer readable medium(s) may be utilized. The computer readable medium may be a computer readable signal medium or a computer readable storage medium. A computer readable storage medium is a system, apparatus, or device of an electronic, magnetic, optical, electromagnetic, or semiconductor nature, any suitable combination of the foregoing, or equivalents thereof. More specific examples (a non-exhaustive list) of the computer readable storage medium would include the following: an electrical device having a storage capability, a portable computer diskette, a hard disk, a random access memory (RAM), a read-only memory (ROM), an erasable programmable read-only memory (EPROM or Flash memory), an optical fiber based device, a portable compact disc read-only memory (CDROM), an optical storage device, a magnetic storage device, or any suitable combination of the foregoing. In the context of this document, a computer readable storage medium is any tangible medium that can contain or store a program for use by, or in connection with, an instruction execution system, apparatus, or device.

In some illustrative embodiments, the computer readable medium is a non-transitory computer readable medium. A non-transitory computer readable medium is any medium that is not a disembodied signal or propagation wave, i.e. pure signal or propagation wave per se. A non-transitory computer readable medium may utilize signals and propagation waves, but is not the signal or propagation wave itself. Thus, for example, various forms of memory devices, and other types of systems, devices, or apparatus, that utilize signals in any way, such as, for example, to maintain their state, may be considered to be non-transitory computer readable media within the scope of the present description.

A computer readable signal medium, on the other hand, may include a propagated data signal with computer readable program code embodied therein, for example, in a baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Similarly, a computer readable storage medium is any computer readable medium that is not a computer readable signal medium.

Computer code embodied on a computer readable medium may be transmitted using any appropriate medium, including but not limited to wireless, wireline, optical fiber cable, radio frequency (RF), etc., or any suitable combination thereof.

Computer program code for carrying out operations for aspects of the present invention may be written in any combination of one or more programming languages, including an object oriented programming language such as Java™, Smalltalk™, C++, or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions that implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 2:
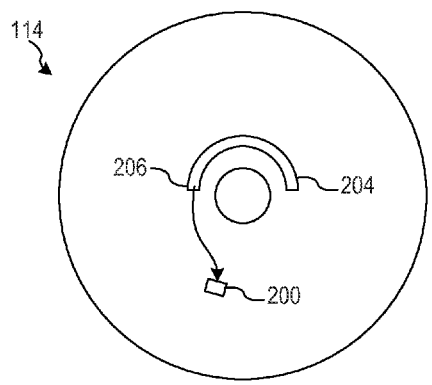
FIG. 2 depicts a trusted data storage device that stores a cluster configuration database in accordance with one embodiment.

In order to provide a context for the description of the specific elements and functionality of the illustrative embodiments, FIGS. 1-2 are provided hereafter as example environments in which aspects of the illustrative embodiments may be implemented. It should be appreciated that FIGS. 1-2 are only examples and are not intended to assert or imply any limitation with regard to the environments in which aspects or embodiments of the present invention may be implemented. Many modifications to the depicted environments may be made without departing from the spirit and scope of the present invention.

With reference now to FIG. 1, there is illustrated a high level block diagram of a data processing environment that may be configured as a cluster system in accordance with one embodiment. In the depicted embodiment, data processing environment 100 includes a distributed collection of homogeneous or heterogeneous networked data processing devices/systems, referred to herein as nodes 102. For example, each node 102 can be implemented with a server computer system, such as one of the POWER servers available from International Business Machines Corporation of Armonk, N.Y. Alternatively, the nodes 102 may be client computing devices or a combination of client and server computing devices may be utilized as nodes 102. Of course, other types of data processing systems may be used without departing from the spirit and scope of the illustrative embodiments.

As shown, each node 102 includes both hardware resources 110 and software resources 120. Hardware resources 110 of nodes 102 include processors 112 for processing data and program instructions, as well as data storage devices 114 such as memory and optical and/or magnetic disks for storing software and data. Hardware resources 110 also include additional hardware 116, such as network, input/output (I/O) and peripheral adapters, power systems, ports, administrative consoles, attached devices, etc. In various embodiments, hardware resources 110 may include at least some redundant or backup resources that may be selectively placed into service, for example, in response to high workload or hardware failure.

The software resources 120 of a node 102 can include, for example, one or more possibly heterogeneous concurrent instances of operating system(s) 122, middleware 124 such as web and/or application servers, and applications 126. In a preferred embodiment, at least one of operating systems 122 includes built-in clustering capability supporting commands and programming APIs to enable creation, maintenance, and management of a cluster from a group of operating system instances on multiple nodes 102. As described further below, the operating system infrastructure supports cluster-wide resource locking mechanisms and notification mechanisms for ensuring efficient distributed cache consistency in accordance with one or more of the illustrative embodiments. In one illustrative embodiment, this clustering capability is provided by cluster-aware Advanced Interactive Executive (AIX™), which is an open standards-based UNIX™ operating system available from International Business Machines Corporation of Armonk, N.Y., augmented to provide logic for facilitating the operations and functionality described herein in accordance with one or more illustrative embodiments.

As further illustrated in FIG. 1, nodes 102 are coupled by one or more wired or wireless, public or private networks 104 to permit sharing of at least some of hardware resources 110 and software resources 120 among different nodes 102 configured to operate as a cluster. Network(s) 104 can include local area networks or wide area networks, such as the Internet, as well as private point-to-point connections between individual nodes 102.

One important function of the cluster architecture is to make shared cluster hardware and software resources highly available. As an example, if an individual node 102 within cluster system 100 fails, one or more applications 126 on the failed node 102 will be automatically migrated by operating system 122 to one or more other nodes 102 in the cluster system 100. Consequently, services provided by the failed node 102 will, after a brief interruption, be continuously available. For an application 126 or other resource to be highly available, multiple nodes 102 within the cluster are usually configured to run that application 126 or resource, although usually at most only one node 102 manages the shared application 126 at any single instant in time.

Those of ordinary skill in the art will appreciate that the hardware and software employed in a cluster system, such as the exemplary data processing environment depicted in FIG. 1, may vary. For example, a cluster system can comprise additional or fewer nodes, one or more client systems, and/or other connections not explicitly shown. The generalized cluster architecture shown in FIG. 1 is not intended to imply any architectural limitations on the claimed invention.

To permit resource sharing between certain nodes 102 in data processing environment 100, while preventing unauthorized access to the shared resources by other nodes 102, clients or other devices, a cluster configuration database preferably defines what nodes 102 are authorized to form and/or join a cluster and thus access the shared resources of the cluster. In one preferred embodiment depicted in FIG. 2, the cluster configuration database 200 resides on a trusted shared data storage device 114 of a host node 102, represented in FIG. 2 by a hard disk 202. Cluster system 100 is constructed and configured such that trusted shared data storage device 114 is only accessible to nodes 102 that are authorized to be members of a cluster (whether or not the nodes 102 actually are members of the cluster at the time of access).

Hard disk 202 includes a boot sector 204 containing the information required to boot the host node 102 under one of operating systems 122. In accordance with a preferred embodiment, boot sector 204 includes a cluster field 206 containing a pointer to cluster configuration database 200, which as shown, preferably resides on the same trusted shared data storage device 114. At a minimum, cluster configuration database 200 identifies which nodes 102 are authorized to join a cluster and thus access shared cluster resources of the cluster.

Figure 3:
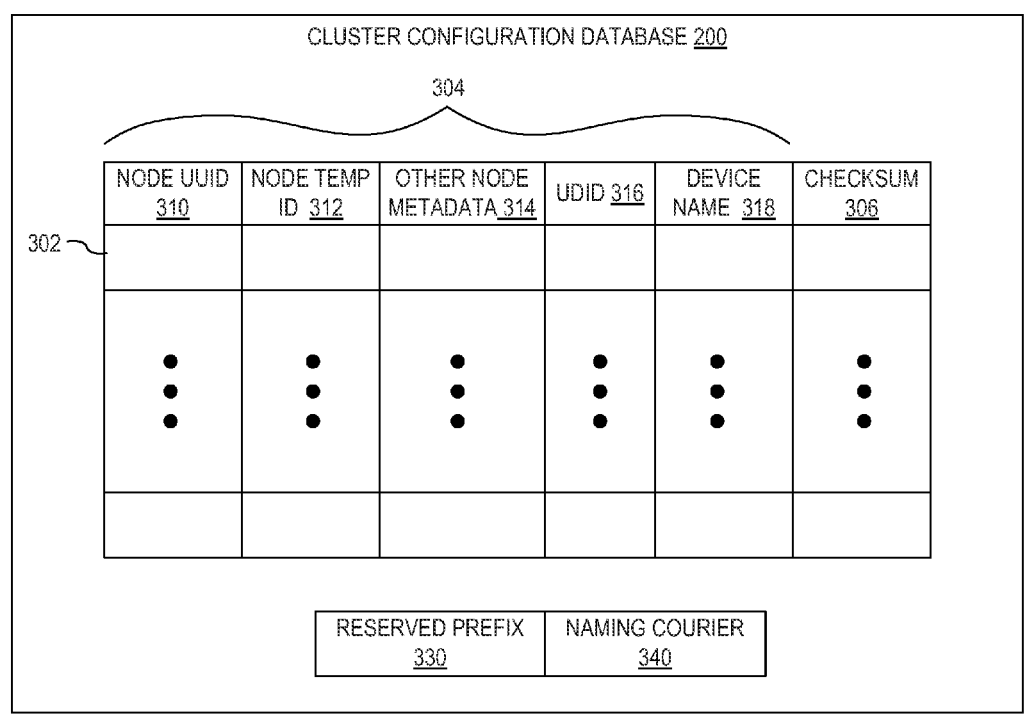
FIG. 3 illustrates an exemplary cluster configuration database in accordance with one embodiment.

With reference now to FIG. 3, there is illustrated an exemplary cluster configuration database 200 in accordance with one embodiment. It should be appreciated that the depiction in FIG. 3 is only for illustrative purposes and is not intended to state or imply any limitation with regard to the manner in which the illustrative embodiments must be implemented. Many modifications to the cluster configuration database 200 may be made without departing from the spirit and scope of the illustrative embodiments.

In the depicted embodiment, cluster configuration database 200 includes a plurality of data records 302 each comprising a payload 304 and a checksum field 306 storing a checksum of the data record's payload 304. The payload 304 of each data record 302 includes a node UUID (Universally Unique Identifier) field 310 for storing the UUID of a respective one of nodes 102. The UUID preferably is self-assigned by the node 102 and conforms to the format described, for example, in ISO/IEC 11578. Data record 302 additionally includes a node temporary ID field 312 that records a temporary identifier of the node 102, such as the hostname or Internet Protocol (IP) address assigned to the node 102. Data record 302 may optionally include one or more additional node metadata fields, shown generally at reference numeral 314, that hold additional metadata regarding the node 102.

As noted above, nodes 102 within a cluster defined by cluster configuration database 200 share software resources 120 and hardware resources 110, including at least some of data storage devices 114. The data storage device(s) 114 of a node 102 to be shared by other nodes 102 of a cluster are identified by Universal Disk Identifiers (UDIDs) (or UUIDs) recorded in UDID field 316 of data record 302. The UDID field 316 of a data record 302 is populated upon the addition of a host node 102 on which the shared data storage devices 114 reside to the cluster configuration.

Associated with UDID field 316 is a disk name field 318 that stores a corresponding device name for each of the shared data storage devices 114 referenced in UDID field 316. As will be appreciated, software, such as operating systems 114, traditionally reference data storage devices by a variety of names, such as the combination of major and minor numbers utilized by UNIX™ to refer to disks. However, in a cluster environment, the migration of software and hardware resources between nodes 102 is hampered by use of inconsistent resource identifiers by different nodes 102 to identify the same resource. Accordingly, cluster configuration database 200 preferably includes support for the generation of unique names for shared data storage devices 114. In the depicted embodiment, this support includes a reserved prefix buffer 330 that holds a reserved prefix of the names of shared data storage devices 114. In addition, cluster configuration database 200 includes a naming counter 340 that monotonically advances (i.e., increments or decrements) to ensure a device name is never repeated during the lifetime of cluster configuration database 200.

The UUID's and/or UDIDs of the nodes and shared resources may be utilized with the mechanisms of the illustrative embodiments when sending cluster-wide event notifications via a cluster event service to the other nodes in the cluster or to a centralized server hosting the shared resources for the cluster. The cluster event service may be any mechanism for cluster wide communication that provides reliable (i.e. guarantees message delivery) and synchronous (the message posting operation does not complete until the message is delivered) messaging capability, e.g., Autonomic Health Advisor File System (AHAFS) or the like.

As mentioned above, when a node obtains a cluster-wide lock on a shared resource and performs a cached write to the shared resource on a local cached copy of the shared resource, the node transmits an event notification out to the other nodes in the cluster, or to the centralized server, or both, informing the nodes of the cluster that the shared resource has been changed and thus, any local copies, or even the source copy, of the shared resource is stale to these other nodes. This event notification may specify, for example, an identifier of the node that has modified the shared resource, an identifier of the shared resource, and a staleness indicator, such as a timestamp, monotonically increasing version number for each resource, or the like. If a version number is used, comparing the version number of a cached copy of a resource against the version number in the event notification can be used to determine if a cached copy of the resource is stale or not. These event notifications are stored in one or more change log data structures for later use when a node wishes to access a shared resource by opening a path to the shared resource, as will be described in greater detail hereafter.

Figures 4, 6:
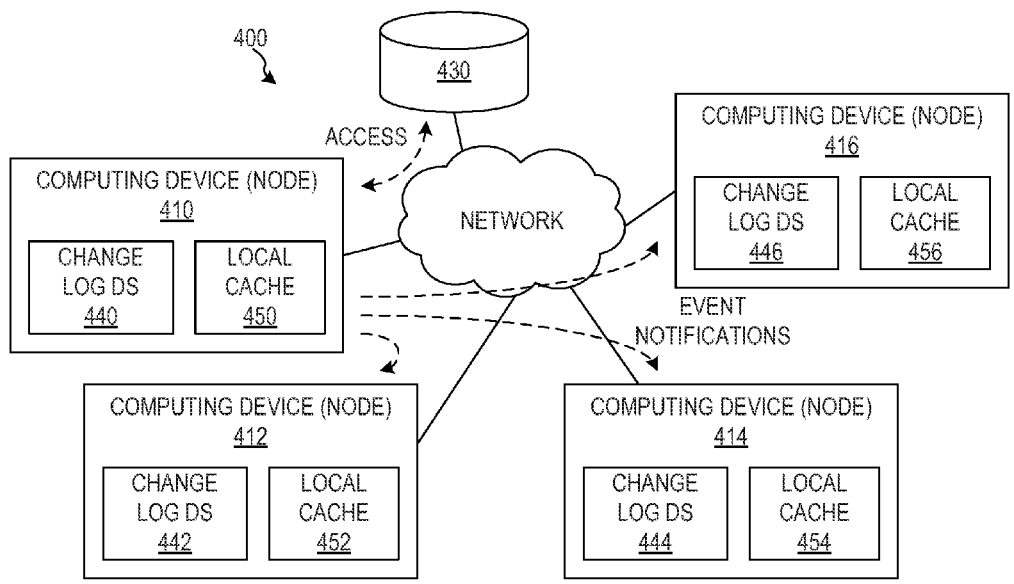
FIG. 4 is an example block diagram illustrating an operation for performing cluster-wide lock of shared resources and access notifications in accordance with one illustrative embodiment.
FIG. 6 is an example diagram of a change log data structure in accordance with one illustrative embodiment.

FIG. 4 is an example block diagram illustrating an operation for performing changes to shared resources and generating event notifications in accordance with one illustrative embodiment. As shown in FIG. 4, a cluster 400 of computing devices 410-416, such as servers, client computing devices, or the like (herein referred to as nodes 410-416), are provided that are configured to operate as a cluster with regard to reliability and share resources in a manner as previously described above. In accordance with one illustrative embodiment, each of the nodes 410-416 comprise a change log data structure 440-446 stored in a local memory of the node 410-416. Each of the nodes 410-416 further comprise a local cache memory 450-456 for caching shared resources for local access to the shared resources. These shared resources may comprise files, data structures, or the like, which are shared by the various nodes 410-416 of the cluster 400 such that any of these nodes 410-416 may perform reads/writes from/to these shared resources. The shared resources may be stored in a network attached storage 430, may be resident in one or more of the nodes 410-416, provided in a centralized server that may be configured as a control server for the cluster 400, e.g., node 416 may be a central cluster control server for the cluster 400, or the like.

When a node, such as node 410, wishes to write to a shared resource, such as a file or data structure stored in the storage system 430, the node 410 caches the writes in a local cache by performing the writes to a local copy of the shared resource in the local cache 450. That is, using node 410 as an example, the node 410 obtains a read lock on the resource using any known cluster resource locking mechanism generally known in the art, reads the shared resource and stores a copy of the shared resource in the local cache 450. Thereafter, the node 410 may obtain a cluster-wide write lock on the shared resource and perform read/write input/output (I/O) operations to the local cached copy of the shared resource in local cache 450 to thereby cache the writes to the shared resource in the local cache 450.

In accordance with the mechanisms of the illustrative embodiments, as the node 410 performs write operations to the shared resource in its local cache 450, the node 410 transmits cluster event notifications to the other nodes 412-416 in the cluster 400. These cluster event notifications are small size datagrams that are transmitted to the other nodes 412-416 that comprise a minimal amount of information indicating (1) the shared resource that is written to, (2) the node that wrote to the shared resource, e.g., node 410 in this example, and (3) a staleness indicator, such as a timestamp or version identifier, that may be used to identify which event notifications, and which versions of the shared resource, are the most recent. These event notifications may take many different forms, but in one illustrative embodiment, the event notification may comprise the staleness indicator, the shared resource UUID or UDID, and the UUID of the node that performed the write of the shared resource. One example format for such an event notification may be of the type {timestamp:FileUUID:SourceNodeUUID}.

When the cluster event notification message is received by the nodes 412-416 of the cluster 400, corresponding change log data structure entries are posted to the local change log data structures 442-446 of the nodes 412-416. It should be appreciated that while FIG. 4 illustrates a single local change log data structure 440-446 being provided in each node 410-416, the illustrative embodiments are not limited to such. Rather, there may be separate change log data structures 440-446 for each of the users of a corresponding node, each shared resource that is able to be shared by the node 410-416, or the like. Thus, in some cases, when generating the change log data structure entries corresponding to received cluster event notifications, the node 410-416 may first identify which change log data structure to generate the event in, such as based on the UUID of the shared resource associated with the cluster event notification.

The change log data structures store the entries for the cluster event notifications in any manner suitable to the particular implementation, e.g., in chronological order based on timestamp associated with the cluster events, in order of receipt, organized according to UUID of the shared resource or the source node that sent the cluster event notification, or the like. The entries are stored in a manner that allows quick searching of the change log data structures for finding matching entries in the change log data structure as will be described hereafter with regard to FIG. 5.

At some point, after first verifying that it possesses the latest version of the shared resource, the node 410 may flush its local cache 450 to the cluster 400 by replicating the local copy of the shared resource on the shared storage system 430, for example. In this case, the node 410 transmits a cluster event notification indicating the central copy of the shared resource is up to date. The other nodes 412-416 may respond to this notification by deleting, invalidating, or otherwise ignoring the previous change log entries corresponding to the shared resource. Such cluster event notification, in some embodiments, may be added as an entry to the local change log data structures 442-446 of the nodes 412-416 as with the other cluster event notifications and may be considered in combination with the other cluster event notifications previously obtained by these nodes 412-416 for the shared resource and source node. In other illustrative embodiments, the receipt of the cluster event notification indicating the flushing of the shared resource initiates a process in the other nodes 412-416 to remove or invalidate entries in their local change log data structures 442-446 corresponding to the shared resource and source node.

Figure 5:
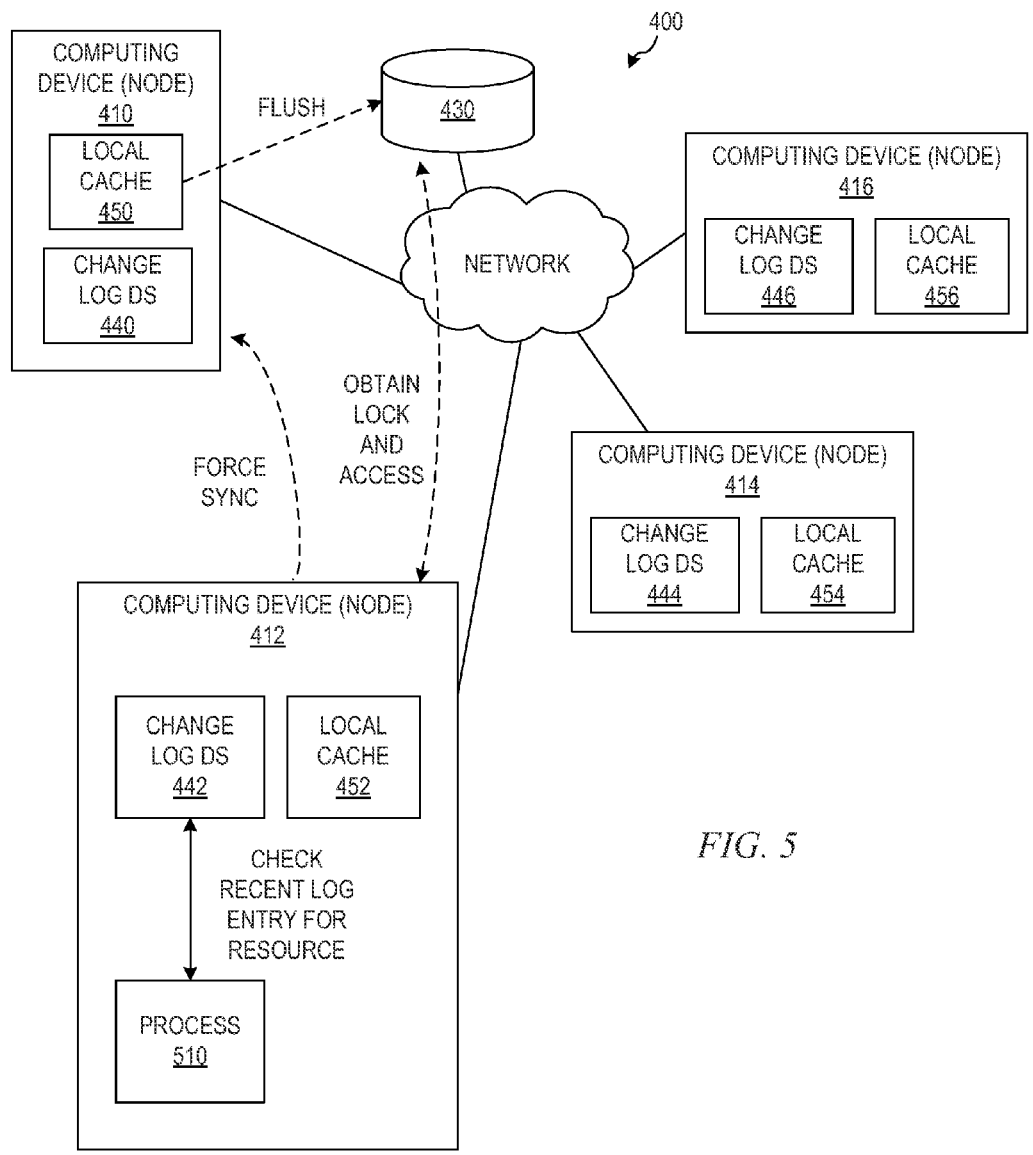
FIG. 5 is an example block diagram illustrating an operation for accessing a shared resource that already has a lock on the shared resource in accordance with one illustrative embodiment.

FIG. 5 is an example block diagram illustrating an operation for accessing a shared resource that already has a lock on the shared resource in accordance with one illustrative embodiment. Elements in FIG. 5 that correspond to elements in FIG. 4 utilize similar reference numerals.

As shown in FIG. 5, when a process 510 on a node 412 wishes to access a shared resource, the node 412 first checks its local change log data structure 442 for entries corresponding to the shared resource for which access is sought. For example, using a UUID of the shared resource, a search of the local change log data structure 442 is performed to identify a most recent change log data structure 442 entry corresponding to the shared resource. The most recent change log data structure 442 entry may be identified based on a comparison of the staleness indicators of the entries matching the shared resource UUID. The most recent change log data structure 442 entry may then be analyzed to determine if the locally-cached copy of the shared resource is presently in a stale state. If not, then the node 412 may proceed to operate on its locally-cached copy of the shared resource.

If the most recent change log data structure 442 entry indicates that the latest version of the shared resource is in fact held by another node, e.g., node 410, then the node 412 seeking access to the shared resource may send a control message to the node 410 to force a synchronization of the node 410's locally cached writes to the shared resource. The forcing of the synchronization may involve causing the node 410 to flush its local cache 450 to the cluster 400 such that the local copy of the shared resource is replicated to the shared storage system 430. As a result of the forced synchronization, the node 410 transmits a cluster event notification indicating the flushing of the shared resource in the manner previously described above. The node 410 may initiate the process of caching and update at a later time, but at this point the node 412 may access the shared resource using a local cached copy in the manner previously described above with regard to FIG. 4.

It should be appreciated that while FIGS. 4 and 5 are described with regard to an embodiment in which each of the nodes 410-416 of the cluster 400 maintain their own change log data structures, the illustrative embodiments are not limited to such. To the contrary, as noted above, in some illustrative embodiments, a centralized set of one or more change log data structures may be associated with the shared resource, such as via a centralized server computing device 416, for example. Thus, in such an embodiment, rather than broadcasting the cluster event notification when writes are performed on a local cached copy of a shared resource by a node, the cluster event notification may be transmitted to the centralized server computing device for use in updating the change log data structure corresponding to the shared resource.

It should be appreciated that the above description of illustrative embodiments assumes a need to flush the most recent copy of a shared resource to the shared storage system 430 in order for another node to obtain access to the most recent version of the shared resource. However, the illustrative embodiments are not limited to such. To the contrary, as noted above, in some illustrative embodiments, the node wishing to operate on the shared resource may request that the node possessing the latest version of the shared resource act as a broker or surrogate for the operations being performed.

As noted above, the illustrative embodiments populate and utilize one or more change log data structures. FIG. 6 is an example of a change log data structure in accordance with one illustrative embodiment. The entries in the change log data structure 600 may comprise a resource identifier 610, e.g., a UUID, that identifies the resource that was changed, a source node identifier 612 identifying a source node performing the change or update of the resource identified by the resource identifier 610, a staleness indicator 614 that identifies the relative staleness of the entry compared to other entries for the same resource in the change log data structure 600 (e.g., a timestamp, monotonically increasing version number, or the like), and an update indicator 616 indicating whether the official source copy of the resource has been updated to the latest version (e.g., a Boolean value). Entries in the change log data structure 600 may be generated in response to notifications sent by nodes when they perform writes, or updates, to their local cached copies of resources and may be updated when flushes of local cached copies of the resources back to the cluster are performed (i.e. updating the update indicator 616).

Figure 7:
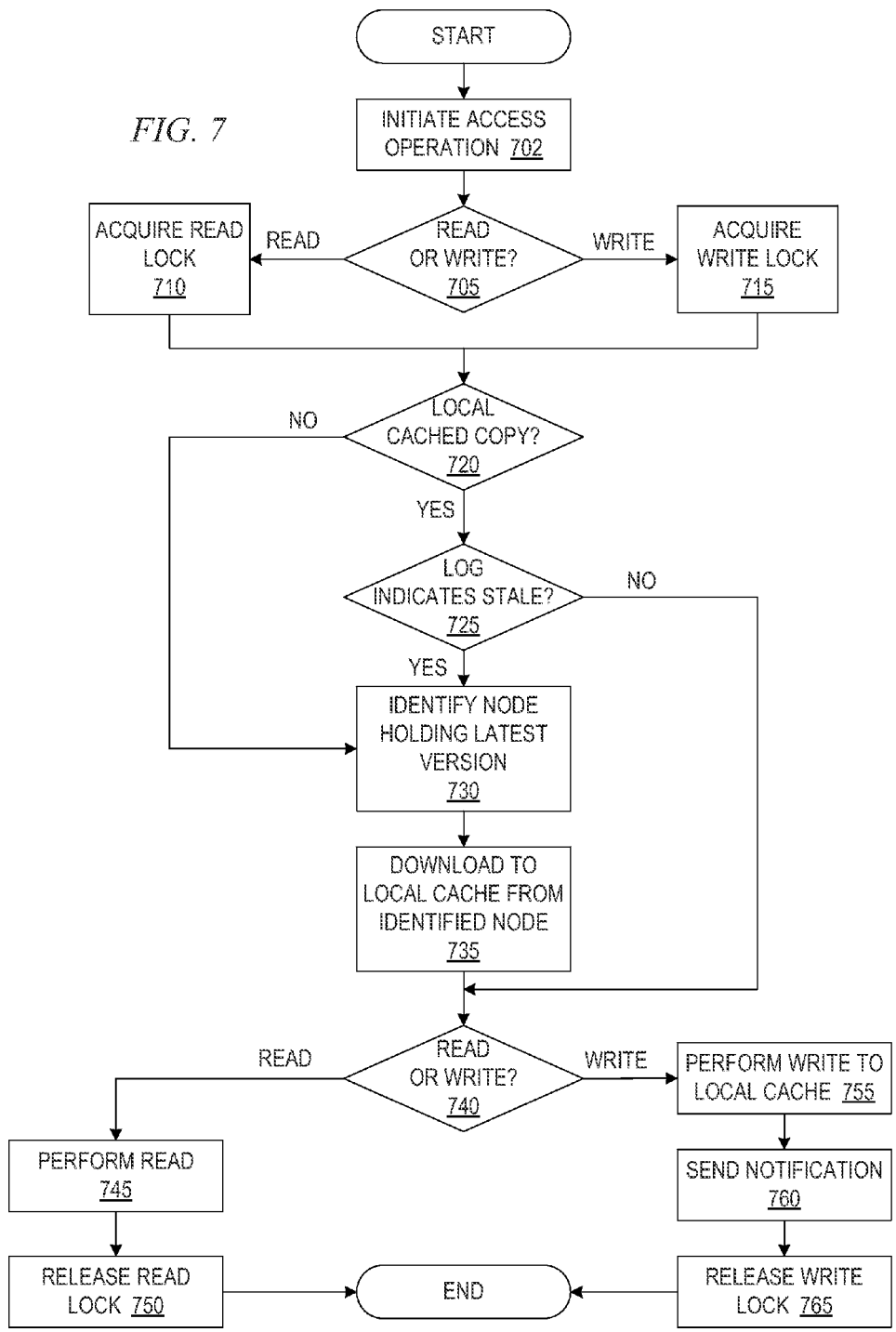
FIG. 7 is a flowchart outlining an example operation for performing read/write operations on a shared resource by a node of a cluster in accordance with one illustrative embodiment.

FIG. 7 is a flowchart outlining an example operation for performing read/write operations on a shared resource by a node of a cluster in accordance with one illustrative embodiment. As shown in FIG. 7, the operation starts with the node initiating an access operation for accessing a shared resource (step 702). A determination is made based on the type of access to the shared resource being initiated, i.e. read or write access (step 705). If the access is a read access, the operation acquires a read lock on the shared resource (step 710). If the access is a write access, the operation acquires a cluster wide write lock on the shared resource (step 715).

Whether the access is a read or a write, a determination is made as to whether the node has a local cached copy of the shared resource (step 720). If the node has a locally cached copy of the shared resource, a determination is made as to whether the latest change log entry for the shared resource indicates that the locally cached copy of the shared resource is stale (step 725). If the locally cached copy is stale, or if there is no locally cached copy (step 720), then a node holding the latest version of the shared resource is identified (from the log entry) (step 730). The latest version of the shared resource is downloaded to the local cache of the node from the node identified in step 730 (step 735).

Thereafter, or in response to the local cache having a latest version of the shared resource, a determination is again made as to whether the access operation is a read or a write (step 740). It should be noted that the decision in step 740 will match the result of the decision in step 705, i.e. it is not possible for step 705 to determine that the access operation is a read/write and step 740 decide that the access operation is the other of a read/write. If the access is a read access operation, then the read operation is performed on the locally cached copy of the shared resource (step 745) and the read lock is then released (step 750). If the access is a write access operation, then the write operation is performed to the locally cached copy of the shared resource (step 755), an event notification is transmitted to the other nodes in the cluster in accordance with the illustrative embodiments previously described (step 760), and the write lock is then released (step 770). The operation then terminates.

In the above operation flow of FIG. 7, it should be appreciated that steps 710, 715, 745, and 765 refer to the mechanics of lock acquisition/release, which in general are well known concepts and thus, no further explanation is needed as to how exactly lock acquisition and release are specifically performed. In step 720, what is being determined is whether a locally cached copy of the shared resource is present or not and if not, then the node can skip attempts to determine whether the cached copy is a latest version since it does not have any version of the shared resource in the local cache. Instead, the operation skips directly to determining where the latest version of the shared resource is currently located (step 730) and downloading it into the local cache of the current node (step 735).

On the other hand, if in step 720 it is determined that the node already has a locally cached copy, the node looks to its local change log and the entries in the change log that corresponding to the shared resource to determine whether the locally cached copy is stale (step 725). If the locally cached copy of the shared resource is not stale (i.e., the node's local copy is the latest copy of the shared resource), then the node can skip acquiring the latest version and proceed directly to the sequence starting with step 740 whereby the node operates on the shared resource, e.g., the file. If node's local copy of the shared resource is stale, the node needs to do the same thing as if it did not have a locally cached copy in the first place, i.e. determining where the latest version is and download it to the nodes local cache (steps 730 and 735).

The sequence of operations beginning with step 740 is where the node knows that it has the latest version of the shared resource in its own local cache and, thus, can perform the desired access operation on the locally cached copy of the shared resource. If node is performing a read operation, the node can perform this operation (step 745) and release the read lock (step 750). No event notification is necessary in this case because the shared resource has not been changed by the read operation. On the other hand, if the node is performing a write operation, the write operation is performed to the node's locally cached copy of the shared resource (step 755), and an event notification is transmitted to the other nodes of the cluster indicating that the shared resource has been changed (step 760), and the write lock is released (step 765).

As described above, the event notification comprises the synchronous reliable "event" whereby each participating node in the cluster is guaranteed to receive the datagram before the above flow proceeds out of step 760. In an illustrative embodiment, the event notification datagram comprises (a) The identity (e.g. UUID) of the resource being changed, (b) the identity of the source node (the node performing the update or change to the shared resource), (c) a staleness indicator, e.g., time stamp, if the cluster is time-synchronized, or a monotonically increasing version number. In one illustrative embodiment, the datagram is transmitted to each participating node via a reliable synchronous channel, such as AHAFS or the like, and each node reacts to receiving this datagram by storing its contents in a local change log data structure. In a different embodiment, the datagram is appended to a change log which resides in a central storage location, and individual nodes need take no action until/unless they need to act on the same resource.

In steps 725 and 730, a node wishing to operate on a particular shared resource must consult the change log and find the latest (according to staleness indicator (c) in the change log entry, e.g., time stamp or version number) entry pertaining to that shared resource (as identified by the identity (a) in the change log entry). Straightforward, well-known techniques are used to filter the change log data structure, either in the local environment or at the centralized storage location, such that only entries with the relevant (a) resource UUID are considered, and sort these entries such that only the latest entry, according to (c) the staleness indicator, are considered. Having isolated a single log entry in this fashion, the identity of the source node (b) indicates the identity of the node holding the latest version of the desired resource.

There are two special cases to consider in addition to the operations outlined above. The first special case is if no matching entry is found in the change log data structure. This means that the shared resource in question has not been cached locally on any node of the cluster and step 735 results in the requesting node retrieving the shared resource from the shared resource's source storage location. This can actually come about in two ways: i) the resource has truly never been cached locally on any node; or ii) a flush operation was performed (see flush operation outlined in FIG. 8 hereafter). That is, in some embodiments, the reaction to notification 850, described hereafter, may be to delete all change log entries whose resource identifier (a) matches that of the event notification. It should be appreciated that the node that performs the flush would still have the latest copy of the shared resource cached locally and would want to continue taking advantage of this. In illustrative embodiments where the change log is located in a local environment of the node, the node that performed the flush operation may achieve this by not deleting all matching change log entries. Alternatively, the node that performed the flush may simply compare the source copy's version indicator (c) to that of his own local cached copy.

In a second special case, the matching entry may indicate that the latest version of the shared resource was flushed to the source storage location of the shared resource. In one embodiment, this may be accomplished by using a predetermined special value for (b) in the entry of the change log, i.e. the identity of the source node. In another embodiment, the datagram may possesses a fourth field comprising a boolean indicator that indicates that the official source copy of the resource has been updated to the latest version. In this special case, step 735 results in the requesting node retrieving the shared resource from its source storage location, again with the exception that the node whose identity matches (b) can skip the download because the node already has the latest version cached.

Figure 8:
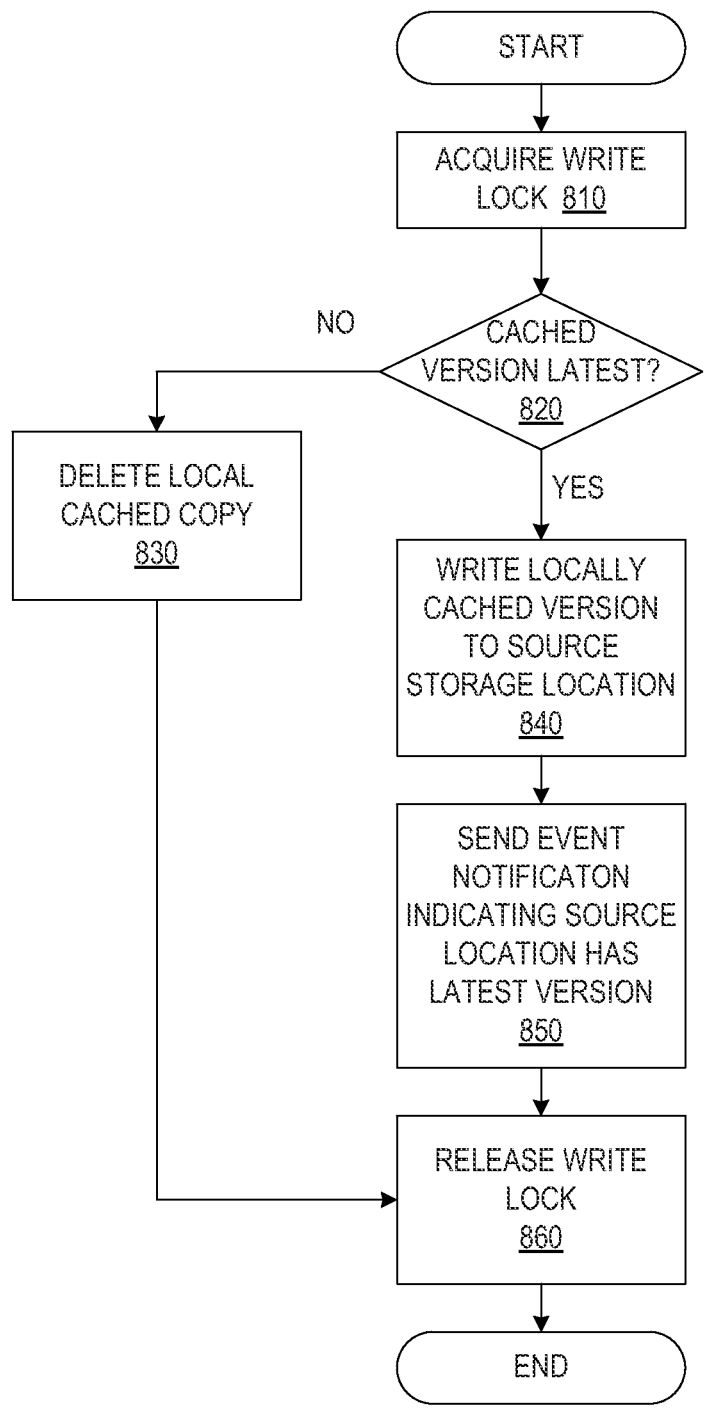
FIG. 8 is a flowchart outlining an example operation for performing a flush operation on a node of a cluster in accordance with one illustrative embodiment.

FIG. 8 is a flowchart outlining an example operation for performing a flush operation on a node of a cluster in accordance with one illustrative embodiment. As shown in FIG. 8, the flush operation comprises obtaining a write lock on the shared resource (step 810) and determining if the change log entries of the change log indicate that the node has the latest version of the shared resource in its local cache (step 820). If not, then the local cached copy of the shared resource is not the latest version and can be deleted from the local cache (step 830). If the local cached copy of the shared resource is the latest version, then the locally cached version is written to the source storage location for the shared resource (step 840) and an event notification is sent to the other nodes of the cluster indicating that the source location stores the latest version of the shared resource (step 850). Thereafter, or if the locally cached copy is deleted because it is not the latest version (step 830), the write lock is released (step 860) and the operation is terminated.

The operation outlined in FIG. 8 may be initiated for several reasons. The most common reason is simply that such flushing is performed routinely, on a set schedule and/or when periods of low resource usage are detected (so the operation does not interfere with other work). However, it is also possible that such a flush is initiated on demand by another node attempting to access the shared resource as previously described above. In such an embodiment, a new operation is interposed between steps 730 and 735 such as a step 732 (not shown) entitled "Request cache flush from the identified node" and then step 735 would again result in the shared resource being downloaded from its source storage location. Note that in such a circumstance, the flushing node would skip the locking/unlocking (steps 810 and 860) because it is essentially operating under the auspices of the lock already held by the node requesting the flush.

Again, steps 810 and 860 utilize known mechanics of locking/release of write locks on shared resources. In this case, operation is concerned with a write (exclusive) lock because it is undesirable to have other nodes reading the shared resource during this operation since there is no guarantee that the nodes are reading a latest version or a previous (stale) version of the shared resource.

In step 820 it is assumed that processing of the change log finds the latest entry pertaining to the shared resource in question. In this case, it is determined whether the local copy is the latest version of the shared resource simply based on whether the node identifier (b) is the node's own node identifier. If it is not, then the node knows that its locally cached copy, if there is one, is stale, and therefore, the locally cached copy can be safely deleted (step 830). In addition, it is known that there is nothing for the node to flush and the write lock can be released (step 860).

If, via step 820, the node determines that it has the latest version of the shared resource, the node writes the latest version of the shared resource back to the source location and, once it has been written back to the source location, an event notification needs to be sent out to indicate that the source location now has the latest version of the shared resource. The consequences of this event notification are discussed above (see discussion of special cases).

Thus, the illustrative embodiments provide mechanisms for providing efficient distributed cache consistency. The mechanisms ensure cache consistency in a cluster by informing the nodes of write accesses to a local cached copy of a shared resource by a node such that the shared resource state is determined to be stale. Thus, polling of the state of shared resources is not required since the nodes are already informed of the staleness or non-staleness of the shared resources by virtue of the cluster event notifications having small, fixed size payloads. Thus, from small, fixed size event notifications posted by the nodes performing the updates to the shared resource, all of the nodes in the cluster are provided with a consistent cluster-wide view of the shared resources.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system comprising a processor and a memory, for performing a write operation on a shared resource in a cluster of data processing systems, the method comprising:

determining, by the data processing system, whether a locally cached copy of the shared resource is present in a local cache memory of the data processing system;

in response to a determination that a locally cached copy of the shared resource is present in the local cache memory, determining whether the locally cached copy of the shared resource is a latest version of the shared resource; and in response to determining that that locally cached copy of the shared resource is a latest version of the shared resource:

performing the write operation on the locally cached copy of the shared resource to generate an updated locally cached copy of the shared resource; and transmitting a cluster event notification to other data processing systems of the cluster indicating the shared resource was written to and identifying which data processing system in the cluster performed the write operation, wherein the cluster event notification is logged in at least one change log data structure associated with the other data processing systems.

2. The method of claim 1, wherein determining whether a locally cached copy of the shared resource is a latest version of the shared resource comprises:

searching a change log data structure associated with the data processing system for an entry corresponding to the shared resource, wherein the change log data structure stores entries corresponding to cluster event notifications received from other data processing systems in the cluster in response to the other data processing systems accessing shared resources of the cluster; and determining, based on results of the searching of the change log data structure, whether entries in the change log data structure indicate that the locally cached copy of the shared resource is a latest version of the shared resource.

3. The method of claim 2, wherein determining whether entries in the change log data structure indicate that the locally cached copy of the shared resource is a latest version of the shared resource comprises:

identifying a latest entry in the change log data structure corresponding to the shared resource based on a staleness indicator of the entries in the change log data structure; and determining if a source identifier in the latest entry matches an identifier of the data processing system, wherein the source identifier identifies a data processing system that performed a write operation to the shared resource.

4. The method of claim 2, wherein determining whether entries in the change log data structure indicate that the locally cached copy of the shared resource is a latest version of the shared resource comprises:

determining whether there are no entries corresponding to the shared resource in the change log data structure; and in response to determining that there are no entries corresponding to the shared resource in the change log data structure, determining that the locally cached copy of the shared resource is not the latest version of the shared resource.

5. The method of claim 2, further comprising:

in response to determining, based on the entries in the change log data structure, that the locally cached copy of the shared resource is not the latest version of the shared resource, identifying a storage location of the latest version of the shared resource based on the entries in the change log data structure;

reading a the latest version of the shared resource from the storage location of the latest version of the shared resource; and storing a new locally cached copy of the shared resource in the local cache memory of the data processing system.

6. The method of claim 1, wherein the cluster event notification comprises at least one of a version number of the updated locally cached copy of the shared resource or a timestamp corresponding to a time when the write operation was performed on the locally cached copy of the shared resource, a unique identifier of the data processing system, and a unique identifier of the shared resource.

7. The method of claim 1, further comprising performing a flush of the local cache memory of the data processing system in response to an event, wherein performing the flush of the local cache memory comprises:

determining if a locally cached version of the shared resource is the latest version of the shared resource; and based on results of determining if the locally cached version of the shared resource is the latest version of the shared resource, either writing the locally cached version back to a source storage location of the shared resource or deleting the locally cached copy of the shared resource from the local cache memory.

8. The method of claim 7, wherein if the results of determining if the locally cached version of the shared resource is the latest version of the shared resource indicate that the locally cached version of the shared resource is the latest version of the shared resource, the method comprises writing the locally cached version back to the source storage location of the shared resource and sending an event notification to the other data processing systems of the cluster indicating that the latest version of the shared resource is located at the source storage location.

9. The method of claim 1, wherein the at least one change log data structure comprises a plurality of change log data structures, each change log data structure being resident on a corresponding one of the data processing systems in the cluster.

10. The method of claim 1, wherein the at least one change log data structure comprises a single change log data structure associated with a source storage location of the shared resource.

* * * * *